United States Patent
Bennett et al.

(10) Patent No.: US 11,017,131 B2
(45) Date of Patent: May 25, 2021

(54) SYSTEM AND METHODS FOR OPTIMIZING DISTRIBUTION NETWORK DESIGNS IN REAL-TIME

(71) Applicant: SCHNEIDER ELECTRIC USA INC., Andover, MA (US)

(72) Inventors: John Bennett, Garrett Park, MD (US); Kevin Abram Heater, Fort Collins, CO (US); Michael Louis Braun, Fort Collins, CO (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 569 days.

(21) Appl. No.: 15/410,515

(22) Filed: Jan. 19, 2017

(65) Prior Publication Data
US 2017/0206292 A1 Jul. 20, 2017

Related U.S. Application Data

(60) Provisional application No. 62/280,685, filed on Jan. 19, 2016.

(51) Int. Cl.
*G06F 30/18* (2020.01)
*G06F 30/20* (2020.01)

(52) U.S. Cl.
CPC ............ *G06F 30/18* (2020.01); *G06F 30/20* (2020.01)

(58) Field of Classification Search
CPC .... G06F 17/509; G06F 17/5009; G06F 30/18; G06F 30/20
USPC ........................................................... 703/1
See application file for complete search history.

(56) References Cited

U.S. PATENT DOCUMENTS

| 6,643,669 | B1 | 11/2003 | Novak et al. |
| 7,054,799 | B1* | 5/2006 | Hartell ............... G06F 17/5009 703/2 |
| 7,647,136 | B2* | 1/2010 | McDowell ............... F17D 3/01 700/282 |

(Continued)

OTHER PUBLICATIONS

Dharchoudhury, Abhijit, et al. "Design and analysis of power distribution networks in PowerPC/sup TM/microprocessors." Proceedings 1998 Design and Automation Conference. 35th DAC.(Cat. No. 98CH36175). IEEE, 1998. (Year: 1998).*

(Continued)

*Primary Examiner* — Justin C Mikowski
(74) *Attorney, Agent, or Firm* — Lando & Anastasi, LLP

(57) ABSTRACT

A system and methods for optimizing distribution network designs are disclosed. In some embodiments, the disclosed system detects placement of a component in a network design. In response, the disclosed system generates multiple design alternatives incorporating the component in different configurations and/or at different locations. The disclosed system determines in parallel a design goal metric associated with at least one design goal that is to be optimized for each of the design alternatives including the original design. The disclosed system then identifies a preferred network design based on the goal metrics. The goal metric of the preferred distribution network design indicates a higher level of optimization with respect to the at least one design goal compared to other of the design alternatives. By performing the optimization, the disclosed system ensures that the optimal configuration is selected and applied in the design.

25 Claims, 11 Drawing Sheets

(56) References Cited

U.S. PATENT DOCUMENTS

| | | | |
|---|---|---|---|
| 2003/0033117 A1* | 2/2003 | Sage | G06F 17/5004 702/182 |
| 2004/0236620 A1 | 11/2004 | Chauhan et al. | |
| 2007/0168923 A1 | 7/2007 | Connor et al. | |
| 2008/0077368 A1 | 3/2008 | Nasle | |
| 2008/0091742 A1 | 4/2008 | Marshall | |
| 2008/0300834 A1* | 12/2008 | Wiemer | G06F 17/504 703/2 |
| 2010/0191774 A1 | 7/2010 | Mason, Jr. et al. | |
| 2011/0209081 A1* | 8/2011 | Chen | G06F 30/00 715/771 |
| 2012/0022713 A1 | 1/2012 | Deaver, Sr. et al. | |
| 2012/0066578 A1 | 3/2012 | Robin et al. | |
| 2013/0179140 A1 | 7/2013 | Sharma | |
| 2013/0211797 A1* | 8/2013 | Scolnicov | G06Q 10/0639 703/2 |
| 2015/0012148 A1 | 1/2015 | Bhageria, Jr. et al. | |
| 2015/0180538 A1 | 6/2015 | Smith et al. | |
| 2017/0193029 A1 | 7/2017 | Bennett et al. | |
| 2017/0195187 A1 | 7/2017 | Bennett et al. | |
| 2017/0195188 A1 | 7/2017 | Bennett et al. | |
| 2017/0206292 A1 | 7/2017 | Bennett et al. | |

OTHER PUBLICATIONS

Ash, Jeff, and David Newth. "Optimizing complex networks for resilience against cascading failure." Physica a: statistical mechanics and its applications 380 (2007): 673-683. (Year: 2007).*

Sharma, Mithun J., Ilkyeong Moon, and Hyerim Bae. "Analytic hierarchy process to assess and optimize distribution network." Applied Mathematics and Computation 202.1 (2008): 256-265. (Year: 2008).*

Sherali, Hanif D., and Ernest P. Smith. "A global optimization approach to a water distribution network design problem." Journal of Global Optimization 11.2 (1997): 107-132. (Year: 1997).*

Shimizu, Yoshiaki, and Hiroshi Kawamoto. "An implementation of parallel computing for hierarchical logistic network design optimization using PSO." Computer Aided Chemical Engineering. vol. 25. Elsevier, 2008. 605-610.*

Hijazi et al., "IFC to CityGML transformation framework for geo-analysis: a water utility network case," 4th International Workshop on 3D Geo-Information, Nov. 4-5, 2009, Ghent, Belgium, 2009. (Year 2009).

Lee, Jiyeong, "3D data model for representing topological relations of urban features," Proceedings of the 21st annual ESRI international user conference, San Diego, CA, USA, 2001. (Year: 2001).

Lee, Jiyeong, "A spatial access-oriented implementation of a 3-D GIS topological data model for urban entities," GeoInformatica 8.3 (2004): 237-264. (Year: 2004).

Collins-Sussman et al., "Version Control with Subversion, for Subversion 1.7", 2011 (Year: 2011).

U.S. Appl. No. 15/398,670, filed Jan. 4, 2017, John Bennett et al.
U.S. Appl. No. 15/398,654, filed Jan. 4, 2017, John Bennett et al.
U.S. Appl. No. 15/398,611, filed Jan. 4, 2017, John Bennett et al.

* cited by examiner

| ID | Adjacent IDs |
|---|---|
| 1 | 100 |
| 10 | 100, 101 |
| 20 | 101, 102, 103 |
| 40 | 400 |
| 41 | 301 |
| 42 | 302 |
| 50 | 102, 200, 201, 202 |
| 51 | 103, 300, 301, 302 |
| 60 | 200 |
| 61 | 201 |
| 62 | 202 |
| 100 | 1, 10 |
| 101 | 10, 20 |
| 102 | 20, 50 |
| 103 | 20, 51 |
| 200 | 50, 60 |
| 201 | 50, 61 |
| 202 | 50, 62 |
| 300 | 51, 40 |
| 301 | 51, 41 |
| 302 | 51, 42 |

| ID | Adjacent IDs | Source ID | Phases |
|---|---|---|---|
| 1 | 100 | 1 | ABC |
| 100 | 10 | 1 | ABC |
| 10 | 101 | 1 | ABC |
| 101 | 20 | 1 | ABC |
| 20 | 102 | 1 | ABC |
|  | 103 | 1 | B |
| 102 | 50 | 1 | ABC |
| 50 | 200 | 1 | ABC |
|  | 201 | 1 | ABC |
|  | 202 | 1 | ABC |
| 200 | 60 | 1 | ABC |
| 201 | 61 | 1 | ABC |
| 202 | 62 | 1 | ABC |
| 103 | 51 | 1 | B |
| 51 | 300 | 1 | B |
|  | 301 | 1 | B |
|  | 302 | 1 | B |
| 300 | 40 | 1 | B |
| 301 | 41 | 1 | B |
| 302 | 42 | 1 | B |

SYSTEM AND METHODS FOR OPTIMIZING DISTRIBUTION NETWORK DESIGNS IN REAL-TIME

CROSS-REFERENCE TO RELATED APPLICATION(S)

The present application claims priority to and benefit from U.S. Provisional Application Ser. No. 62/280,685 entitled "System and Methods for Optimizing Network Designs in Real-Time" filed on Jan. 19, 2016, the content of which is incorporated herein by reference in its entirety.

TECHNICAL FIELD

The disclosed technology generally relates to the field of utility distribution networks, and specifically to design and optimization of utility distribution networks.

BACKGROUND

Utility companies provide services such as electricity, gas, water, telecommunication, cable television, etc., to customers. All of these services require a distribution network for the area that is being serviced. As used herein, a distribution network comprises of pipelines, cables, and/or other equipment to facilitate distribution of a utility to customers. For example, an electrical distribution network comprising of cables/overhead lines and sub-stations facilitates distribution of electricity from a transmission/sub-transmission network to customers. Data representing the distribution facilities (poles, conductors, transformers, switching and protective equipment, etc. for electric distribution utilities) are stored in a facilities database, typically a relational database that includes geospatial attributes (i.e. a Geographic Information System, or GIS). Various software applications are available to facilitate design, editing, analysis and visualization of distribution networks. These applications typically work directly against the GIS database model, requiring execution of queries and calculations in the GIS which can result in performance issues (e.g., longer processing times and slow response). Moreover, many of existing network design applications have inefficiencies causing designers to expend significant amounts of time and effort to design networks that meet their requirements. Consequently, the process of designing networks can be lengthy, the final design itself may not be optimal because of the time constraints and complexity involved in the design work.

BRIEF DESCRIPTION OF THE DRAWINGS

FIG. 2C is a graphical diagram illustrating an adjacency list for an undirected graph based on GIS feature data from a GIS database.

FIG. 2D is a graphical diagram illustrating an adjacency list for a directed graph created from the undirected graph in FIG. 2C.

DETAILED DESCRIPTION

1. Overview

Figure 1:
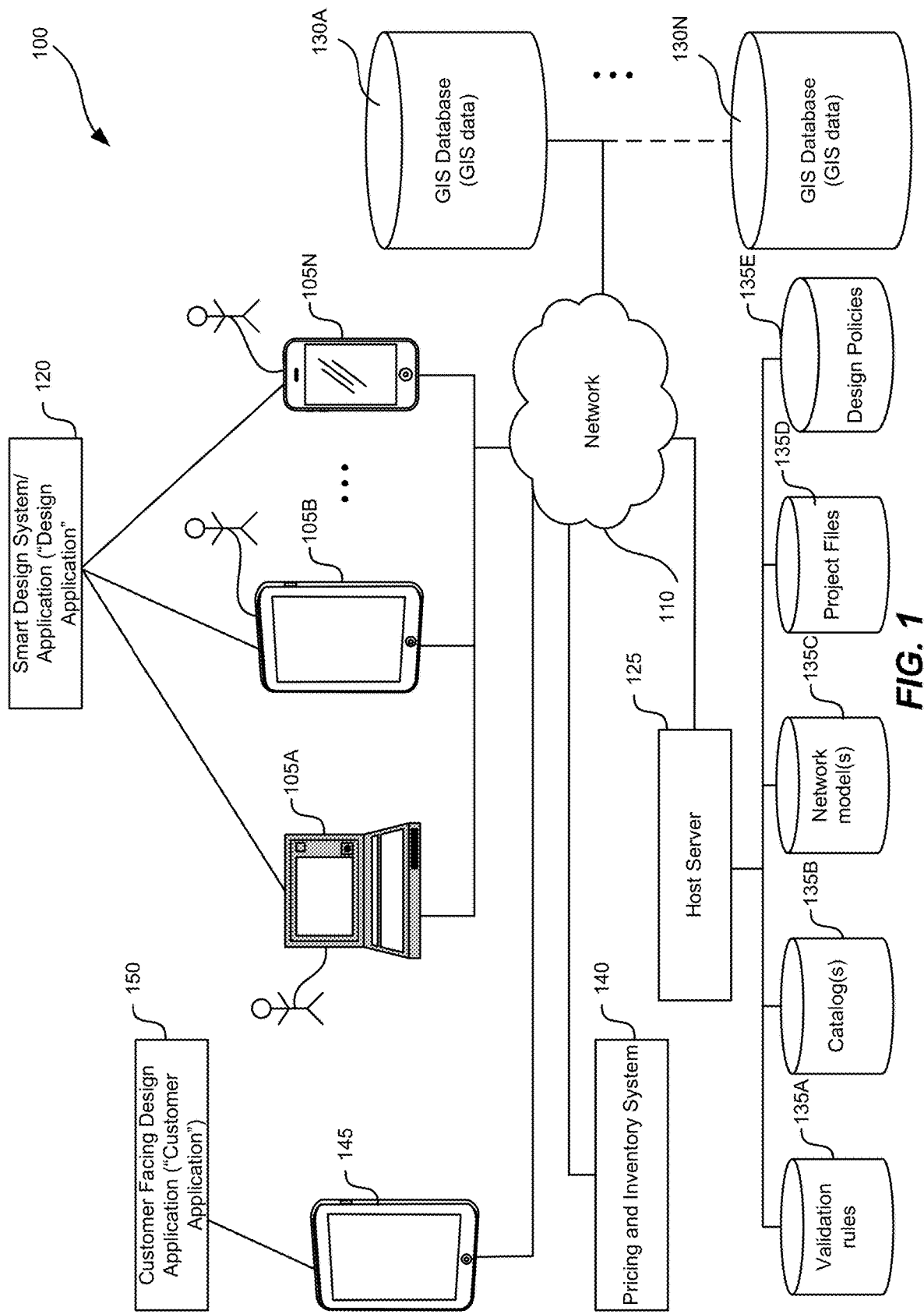
FIG. 1 is a block diagram illustrating an example environment in which a system and methods for real-time optimization of distribution network designs (hereinafter the "disclosed system") can operate.

System and methods for optimizing distribution network designs in real-time (hereinafter "disclosed system" or "disclosed technology") are disclosed. The disclosed system can optimize the design of a distribution network ("network") in real-time or near real-time. In some embodiments, the disclosed system can optimize a network design, and further streamline the design process by automatically configuring components as they are added to a network design by a designer (i.e., the user). The automatic configuration ensures that the user does not need to spend a lot of time selecting the right configurations, as the system can make the selection for the user based on one or more design goals. For example, consider a network design having components such as amplifiers. Typically, pads and equalizers need to be selected at each amplifier to condition the input signal to a flat profile of proper strength. Since a manufacturer may offer a dozen different pads and equalizers, the number of combinations that could be explored to find a suitable combination can be daunting to a designer, and take a significant amount of time. Instead of the designer manually finding the related components, adding them to the design, and performing related analysis or calculations to ensure optimal performance, the disclosed system can generate and assess potential component configurations and select or recommend one that is optimal. In some embodiments, the potential component configurations can be generated based on information such as the properties of the component. Moreover, the optimal component configurations can be selected based on dependencies that the component has with one or more other components in the network design and one or more design policies, and/or the like.

Design policies are created to ensure that any network design meets certain design standards (e.g., regulatory compliance, component reliability, cost). Design policies, as used herein, refer to a broad category of normative statements about goals (e.g., optimize performance and/or cost), requirements (e.g., for compliance with regulatory standards, safety standards, reliability standards, etc.), quality metrics (e.g., performance metrics, cost metric, goal metric), and the like for network designs. Validation rules, which include rules to ensure that a network design meets certain requirements and/or standards, can be considered a subclass of design policies. Specifically, in some embodiments, validation rules can be expressed in the binary (i.e., yes/no or pass/fail). Design policies, on the other hand, allow for more than one solution which the disclosed system can evaluate to identify an optimal solution. Some of these design policies can be specific to the utility/organization. By way of example, an electric distribution network can have a design policy that specifies that the worst case voltage drop can be no more than 5% of the nominal voltage. Another example of a design policy can be that all protective devices must be sized appropriately to protect exactly the portion of the circuit they are intended to protect. In some aspects, some of the design policies can be set by the designer and/or the organization and in some cases can be project or design specific. For example, an organization can set a design policy whereby the worst case voltage drop at the feeder circuit can be no more than 2% in all projects.

The disclosed system can then evaluate the configurations against one or more design policies to ensure design and regulatory standards are respected and use the highest ranked configuration to automatically update the component in the network. The ranking can be facilitated by computing optimization scores that provide an indication of how well the configurations meet the design goals. In some embodiments, update of the component using the highest ranked configuration can be in response to user confirmation. In some embodiments, the disclosed system can perform the optimization asynchronously in a non-blocking manner as the designer (i.e., the user) builds out the network. Once the component is configured using the selected configuration, the disclosed system, in some embodiments, can also perform other operations such as creating and/or updating graphical charts and data, such as forward and return signal profiles, presenting component properties, updating graphic and schematic views, running signal and network topology validations, performing powering calculations, and/or the like. Network topology validations and performing powering calculations are described in detail in U.S. application Ser. No. 15/398,654 titled "System and Method for Validating Network Configuration Changes in a Client Environment," filed on Jan. 4, 2017, the entire content of which is incorporated herein by reference in its entirety.

In some embodiments, the disclosed system can optimize and streamline the design process by providing intelligent design tools. These intelligent design tools can make decisions regarding component selection, configuration and/or placement using information about the component properties, existing network configuration including relationships among components and/or relevant design policies, making the design process more efficient. For example, the intelligent design tools can interpret information in the network modeling construct (NMC) and utility-configured standards to generate drawings and present compatible units that make sense for the job a designer is doing at that particular location in the network. The NMC is described in detail in U.S. application Ser. No. 15/398,611 "System and Methods for Creating a Geospatial Network Model in a Client Environment" filed on Jan. 4, 2017, the entire content of which is incorporated by reference herein. The intelligent design tools of the disclosed system can go beyond component placement. The intelligent design tools can in some embodiments follow a workflow of component placement that can include automatically selecting appropriate materials and equipment based on information about the existing network configuration as well as rules and standards particular to a utility (e.g., design policies). One example intelligent design tool can include a one-click service drop. Using this tool, the user can indicate where a service is to be placed on a map (e.g., via tapping, clicking or other gesture) and then the disclosed system can calculate that best way to serve that location from the existing network and add both the spatial components and the compatible units to the design.

Another example intelligent design tool is an intelligent line extension tool which starting from a selected tap feature (e.g., a transformer), automatically selects both the structural and electrical components suitable for extending that line. The intelligent design tool can assist the designer by automatically populating conductors, setting span lengths, and pole placement, adding guys and anchors at appropriate locations, and adjusting the assemblies to accommodate loading so as to stay within regulatory standards. This is accomplished with the NMC and real-time design optimization techniques discussed throughout the present disclosure.

In some embodiments, the disclosed system can optimize the design process by generating a material list for a network design. Once a network design has been completed, a list of materials necessary to build out the network in the real world needs to be produced. The disclosed system generates such a bill of material to facilitate the construction of the network in the real world. For example, in a coaxial cable communications network, the bill of material can enumerate the type and quantity of each component, cable, and cabinet required for construction as well as a list of necessary component internals such as pads, equalizers, internal splitters, etc. The type and length of construction effort can also be tabulated to estimate total labor costs. The disclosed system can also communicate with a pricing/inventory system to determine total cost, material cost, labor cost, and/or the like. In some embodiments, the disclosed system can generate a bill of material and/or a cost estimate in real time as part of the design optimization process. This enables a designer working in the field to generate cost estimates for different design alternatives on the fly and share the information with a customer, without having to go back to the office and consult different sources of information which are not readily available.

In some embodiments, the disclosed system can optimize and streamline the design process by utilizing a parametric modeling technique that causes an update to an object in a network design to cascade through to other objects in the network design with which the object has a relationship. For example, suppose a designer draws a line representing an underground electric conductor or gas main that is offset 3 meters from a street edge. The length and shape of that line is defined by its position relative to the shape and length of the street edge. If the designer desires to adjust that original offset to 5 meters, a parametric relationship will preserve the relationship with street edge. The disclosed system can re-draw and re-shape the line to meet the new offset distance. In existing applications, the most efficient way to make this type of adjustment was to re-draw the line rather than try to perfectly adjust each vertex. However, in utility networks, a line or point can have relationships with many objects such as the service connections along a line. The disclosed system, using the parametric modeling technique, preserves all of these object relationships and updates these relationships in a cascade that is transparent to the user. The ease of updating existing networks or modifying design components is greatly enhanced by this technique.

In some embodiments, the disclosed system can optimize and streamline the design process by capturing and encapsulating common tasks, jobs, and/or standards in design criterion rules. As used herein, design criterion rules are rules that are captured in the design process. Enabling a user to create and capture workflows at design time reduces the complexity and cost of initial configuration and enables utilities to capture the industry knowledge of experienced designers and use that knowledge to build a knowledge-base that can be utilized by junior designers. This method enables users to choose when a particular compatible unit (CU) or component should be preserved in a rule that can either be saved to the user's own palette or workspace, or shared with other designers in the organization to use in their own designs.

In some embodiments, the disclosed system can optimize and streamline the design process by providing a gesture aware design application executable on a tablet or a mobile device to detect gestures (e.g., interactive panning gestures made using a finger or stylus) at a touch screen interface of the tablet or mobile device. The gesture aware design application has access to the full NMC for a utility network to derive the connectivity information and drive compatible unit compilation without redundant work from the designer. The user experience closely resembles the drawing experience of pen and paper rather than drawing over a traditional laptop or desktop computer and mouse drawing environment.

In some embodiments, the disclosed system can include a customer-facing design application ("customer application"), which is an application or online service that provides a simplified and limited design environment to utility customers and provides a graphical means for submitting service requests or reporting work needed on existing assets such as a streetlight that is out or a broken cross-arm. The customer application interface can leverage the NMC and services architecture to provide a scaled down network model and basic analysis capability so that the customer can find their premise on a map, create a request for a new service or a maintenance request, select the new service or maintenance location on the map, and enter basic information requested by the utility to initiate the work order for that request. For new service requests, the customer application can add network infrastructure based on defaults and network information at that location. For example, for a new request for an electric service, the customer application can, based on design policies and existing network configuration, select an overhead or underground cabling option, add transformer(s) and conductors, and any other equipment to create the requested electric service. Using the design from the customer application as a starting point, a designer at the utility service provider does not need to spend a lot of time designing or planning the new service. Instead, the designer can quickly verify, optimize or otherwise finalize the design for the new electric service from the customer application. For maintenance work, the customer application can reference existing asset information and automatically add compatible units to the work order. New service connections are estimated to be from 40% to 80% of the number of work orders completed by a utility each year. By providing a customer application for requesting new service or maintenance request, the disclosed system increases efficiency for customer service representatives and designers, improves customer enablement, reduces the cost of design work, and enables utilities to get services installed more quickly to begin collecting revenue.

These and various other embodiments of the disclosed system will now be described in detail.

2. Example Environment

FIG. 1 is a block diagram illustrating an example environment in which a system and methods for real-time optimization of network designs (hereinafter "disclosed system") can operate.

As illustrated, the environment 100 comprises one or more client devices 105A-N (hereinafter client device 105), a communication network 110 and one or more GIS databases 130A-N (hereinafter GIS database 130). The client device 105 can be any hardware device that is able to establish a connection with another device or server, directly or via a communication network 110. Examples of a client device 105 include, but are not limited to: a desktop computer, a thin-client device, a mobile computing device such as a notebook, a laptop computer, a handheld computer, a mobile phone, a smart phone, a tablet, a phablet, and/or the like. The client device 105 typically includes one or more input/output devices to facilitate user interaction (e.g., to display a map, to enable a user to make a selection of an area on the map). In some embodiments, the disclosed system can be embodied in a smart network design (SND) application 120 (hereinafter "design application 120") which is installed in the client device 105. The design application 120 can be downloaded from a server (e.g., host server 125, an application store or a repository) and installed on the client device 105. In some embodiments, the design application 120 can be a web-based application that can be accessed via a web-browser. In some embodiments, the design application 120 can operate by utilizing data stored in the client device's local storage (i.e., network model data remains in the client device but the data may be periodically backed up in the host server or a cloud). Various components or modules of the disclosed system are described in detail in reference to FIGS. 2A and 2B.

In some embodiments, the environment 100 can include one or more customer devices represented by the device 145. A customer-facing design application ("customer application") 150 can be installed on the customer device 145 or accessed from the customer device 145 (e.g., via the web). Like the client device 105, the customer device 145 can be any hardware device. In some embodiments, the customer device can be a device with an interactive touch screen input interface that can accept gestures as input.

The GIS database 130 is a database or file structure that stores objects defined in a geometric space. One example of a GIS database is a geodatabase. Typically, each utility maintains its own GIS database. For example, a gas company can have its own GIS database that stores GIS data for its gas distribution network. Similarly, an electric company can have its own GIS database that stores GIS data for its electric distribution network. The GIS database 130 typically supports query execution on stored data as well as manipulation of the stored data. Examples of data stored in the GIS database include, but are not limited to: geometry or shape data and attributes of objects, typically grouped into different feature classes. The GIS database 130 may be implemented in Microsoft SQL Server, PostgreSQL relational database management systems, Microsoft Access, Oracle, IBM DB2, IBM Informix, and/or the like.

In some embodiments, the environment 100 includes a host server 125. The host server 125 can provide access to validation rules 135A, catalog(s) 135B, network model data 135C and/or project files 135D. These data can be stored in one or more databases or database tables. The validation rules 135A can include rules to ensure that a network design meets certain requirements and/or standards. Typically, validation rules are specific to a distribution network. For example, in a gas distribution network, an applicable validation rule may assert that the diameter of a gas valve must match the diameter of the pipe to which the valve is snapped. By way of another example, in an electric distribution network, an example validation rule may be that the rated kVA of a transformer bank must be sufficient to handle the expected peak power demand of the customers connected to the transformer. Yet another example of a validation rule in an electric distribution network is a fuse coordination validation rule may that the type and current rating of a fuse match the type and current rating of its backup. For example, a network design that has a 60-Amp type N fuse at a location when its backup is an 80-amp type N fuse would result in a validation error.

The validation rules can be configured and extended to meet the specific requirements of a user designing a network or those of an enterprise/organization. The catalogs 135B can store components and design configurations that a user can use to design a network. The network models 135C can store network models associated with network designs. The network models are in general created client-side, and can be uploaded to the host server periodically or on demand for backup or for reuse.

The project files 135D include catalogs of components for network design projects of an organization. A project file can specify a network configuration (e.g., amplifier cascade count, frequency range, target customer counts to reach per branch, etc. in an RF network), components and cables that have been determined to work well (and may be in active inventory rotation) for the given network configuration, and/or the like. By grouping components into project files, a network designer can be confident that a selected component will work for the given design configuration and with the other components specified by the project file. This grouping also aids in efficient creation of a network design by greatly reducing the set of components to choose from in the designer's toolbox—from all components held in an organization's inventory to just a subset selected for the particular design configuration at hand. The design policies 135E which capture the design standards of the utility can be stored in a database.

In some embodiments, the environment 100 includes a pricing and inventory system 140 that is connected to the communication network 110. The pricing and inventory system 140 can determine the total cost, labor cost and/or material cost of building out a network or a portion thereof. The pricing and inventory system 140 can make the cost computations based on a material list that can be generated for a network design. In some embodiments, the pricing and inventory system 140 can be a part of the host server 125.

The communication network 110, over which the client devices 105, the customer device 145, the one or more GIS databases 130 and the host server 125 can communicate may be a telephonic network, an open network, such as the Internet, or a private network, such as an intranet and/or the extranet. The communication network 110 can be any collection of distinct communication networks operating wholly or partially in conjunction to provide connectivity to the client devices 105 and the GIS databases 130 and may appear as one or more communication networks to the serviced systems and devices. In some embodiments, communications can be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, 4G-LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The client devices 105 and customer devices 145 can be coupled to the communication network 110 (e.g., Internet) via a dial up connection, a digital subscriber loop (DSL, ADSL), cable modem, and/or other types of connection. Thus, the client devices 105/customer devices 145 can communicate with remote servers (e.g., host server 125, GIS database 130, pricing and inventory system 140, mail server, instant messaging server), some of which may provide access to user interfaces of the World Wide Web via a web browser, for example.

3. Example System

Figure 2A:
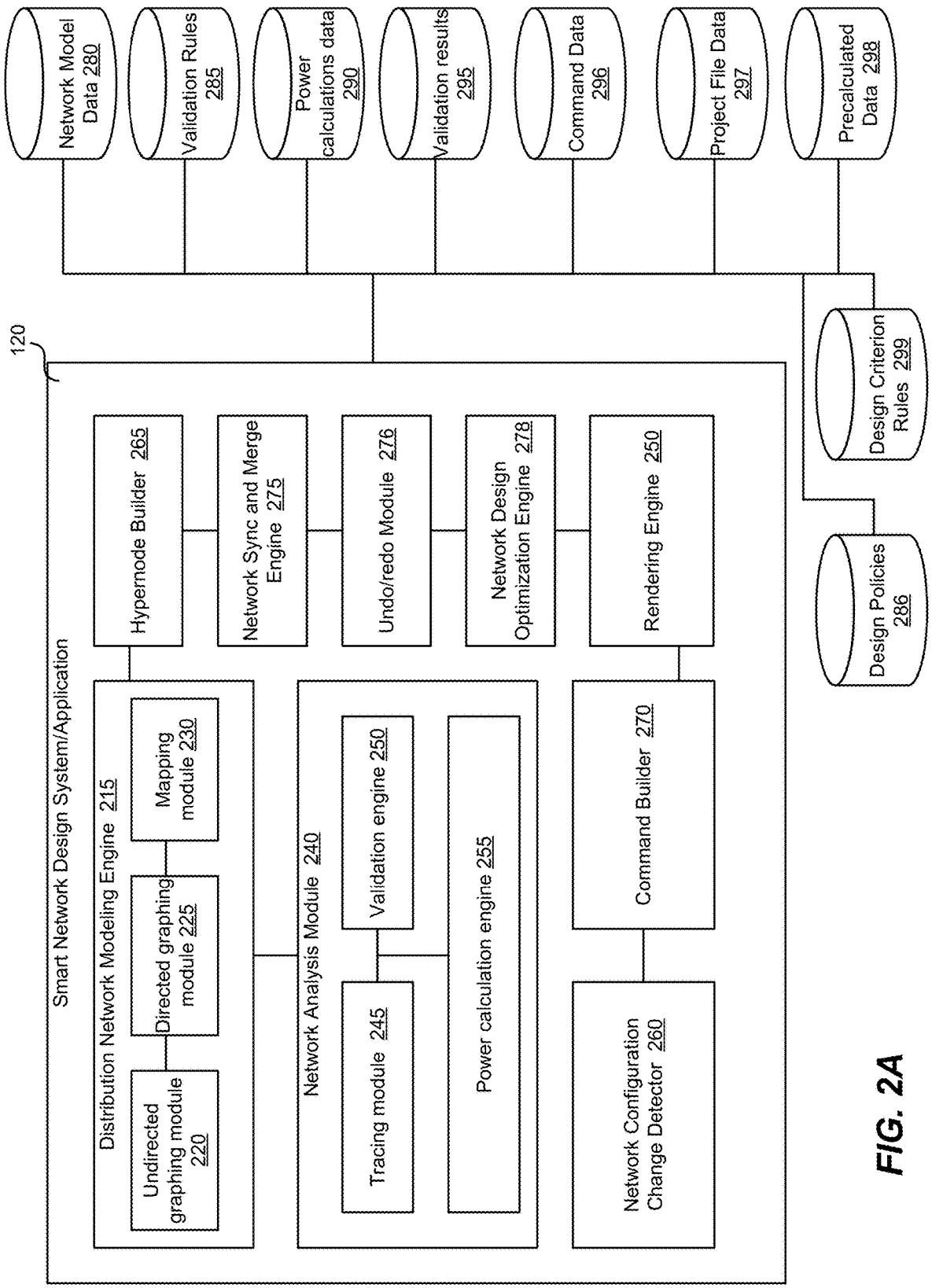
FIG. 2A is a block diagram illustrating example components of the disclosed system in some embodiments.

FIG. 2A is a block diagram illustrating example components of the disclosed system in accordance with some embodiments.

In some embodiments, the disclosed system resides in a client device (e.g., client device 105) and comprises a distribution network model engine 215 having an undirected graphing module 220, a directed graphing module 225 and a mapping module 230, a network analysis module 240 having a tracing module 245, a validation engine 250, and a power calculation engine 255, a rendering engine 250, a network configuration change detector 260, a network operations handler 270 having a command builder 270a, a hypernode builder 265, and a network sync and merge engine 275. In some embodiments, the disclosed system can include an optimization engine 278. Various embodiments of the disclosed system may include more or less components. Similarly, in various embodiments, one or more components can be consolidated together into a single component. In some embodiments, various data utilized or generated by the disclosed system can be stored in a local storage (e.g., cache memory) in the client device. Examples of data stored in the local storage can include network model data 280, validation rules 285, power calculation data 290, validation results 295, command data 296, project file data 297, precalculated static data 298, design criterion rules 299, and/or design policies 286 among others.

In some embodiments, the distribution network model engine 215 generates the network model that supports various operations such as visualization, analysis (e.g., tracing, load flow analysis, operating voltage calculations) and/or editing on a network. The network model engine 215, via the undirected graphing module 220, the directed graphing module 225 and/or the mapping module 230, can transform GIS feature data obtained from a GIS database (e.g., GIS database 130 described in reference to FIG. 1A) into a specialized data structure that can be utilized by the network analysis module 240 to perform various network analyses on the network. For example, the network model can be used by the tracing module 245 to determine for any given vertex in the network (e.g., corresponding to a selection made by a user on a map), the set of all vertices that are upstream and/or downstream of that vertex, with regard to the direction of flow of the network commodity (e.g., electric power, water, gas, electromagnetic signal, and/or the like). The rendering engine 250 can then render all the features that are upstream of the vertex and all the features that are downstream of the vertex in distinct styles (e.g., by using different coloring schemes or highlighting) to clearly illustrate, for example, the flow path of respective electrical phases through the features starting from the source vertex.

In some embodiments, the undirected graphing module 220 utilizes the geometric information in the GIS feature data to construct an undirected graph. As used herein, an undirected graph or an undirected network is a set of adjacency relationships between objects. An adjacency relationship between objects is represented by a commutative pair of object IDs. Suppose one of the endpoints of PrimaryConductor 101 coincides with the location of Switch 10. The undirected graphing module 220 recognizes this connection or adjacency between PrimaryConductor 101 and Switch 10 and in response creates an adjacency relationship between those objects, represented by an ordered pair of object IDs: (101, 10). Since it is an undirected graph, the adjacency relationship is commutative, so the undirected graphing module 220 also creates a complementary ordered pair (10, 101). Once the adjacency relationships between objects have been determined, the undirected graphical module 220 generates an adjacency list or data structure representing the undirected graph. An example of the adjacency list representing an undirected graph constructed from a set of GIS feature data is depicted in FIG. 2C. As illustrated, the adjacency list 276 includes a collection of object IDs and adjacent object IDs. In other words, the adjacency list 276 associates each object in the undirected graph with a set of neighboring objects. For example, object ID 1 is associated with its neighbor object ID 100, and object ID 100 is associated with its neighbors which include object ID 1, as well as object ID 10. In alternative embodiments, a GIS database can be the source of the adjacency list or data structure representing the undirected graph.

The directed graphing module 225 operates on the undirected graph, performing a series of traversals of the undirected graph, beginning at each object that is the source vertex to construct a directed graph. As used herein, a directed graph or a directed network is a set of objects having adjacency relationships, where all the adjacency relationships are directed from one object to another. When traversing the undirected graph, the directed graphing module 225 pays attention to selected attributes of certain objects that are of interest to the application domain. In the domain of electric power distribution, for example, the directed graphing module 225 examines the PhaseDesignation attribute of conductor vertices in the graph and to the ClosedPhases attribute of vertices representing sectionalizing devices. The directed graphing module 225 then uses these attributes to determine, at each step in the traversal, which of the electrical phases that reach a vertex via a given adjacency can be permitted to continue on to the other adjacencies of the vertex. For example, a switch which is open on all three phases blocks all phases, and thus a traversal halts upon reaching any open switch. By way of another example, if a traversal brings phases ABC up to a switch that is closed on phases BC but open on phase A, then only phases B and C will be allowed to pass on to the conductor on the far side of the switch. In other words, each time a traversal reaches a vertex $V_2$ coming from an adjacent vertex $V_1$, the directed graphing module 225 creates, in a new graph, a directed edge ($V_1$, $V_2$) that carries two additional attributes: SourceID and Phases. The SourceID attribute identifies the source vertex from which the traversal began. The SourceID attribute, in some embodiments, effectively serves as an identifier for the entire distribution circuit that is energized by that source. The Phases attribute indicates which electric phases reach all the way from that source to vertex $V_2$, arriving via vertex $V_1$.

The directed graphing module 225 performs a traversal of an undirected graph to output an adjacency list for the directed graph as illustrated in FIG. 2D. The adjacency list 278 for the directed graph includes a set of directed adjacencies with corresponding Source and Phases attributes. The data structure 278 readily supports a tracing operation, i.e., enumerates, for any given vertex in the graph, the set of all vertices that are downstream of that vertex, and all the vertices that are upstream of that vertex. For example, from the data structure it is apparent that vertices 50 and 51 are downstream of vertex 10. The data structure 278 can also support other flavors of network analyses.

The mapping module 230, in some embodiments, manipulates the adjacency list representing the directed graph to optimize the look up performance for network analysis (e.g., tracing or any other operations or analyses), so that the look up performance does not become progressively worse as the size and complexity of a distribution circuit increases. In some embodiments, the mapping module 230 achieves the optimization by renumbering the objects in the directed graph so that the adjacency list for the directed graph can be stored in the form of an array where the array index serves as a proxy for the object's original ID as known to the GIS. Indexing the array in this manner enables random access to the adjacencies for any given vertex in the network, so that the lookup complexity for adjacencies is O(1). The mapping module 230 creates a mapping of GIS IDs to array indexes in the network model, and vice versa, so that the start object for a tracing action can be converted into the corresponding array index, and the trace results, which are developed as a set of array index values to represent the traced objects, can be converted into GIS IDs for those objects. In some embodiments, the adjacency list for the directed graph can be stored in the form of hashtables. In other embodiments, the mapping module 230 may be optional.

In some embodiments, the specialized data structure representing the network generated by the network modeling engine 215 is stored in a local storage 280 (e.g., cache memory). When a user selects an object on a map to see the tracing results, the tracing module 245 accesses the network model data 280 to look up objects that are upstream and/or downstream of the object. Because of the caching of the network model data, there is no need to start from the GIS feature data or data representing the undirected graph and traverse the undirected graph again. Instead the module 225 will have already performed the traversal of the undirected graph once to create the directed graph and in some embodiments, the mapping module 230 will have already converted the data structure for the directed graph into an array or hashtable format and stored the array or hashtable in the local storage 280. This means that in addition to the upstream and downstream orientations, electrical phases and information about the power source are precalculated and can be quickly recalled from the cache memory for tracing operations or to respond to attribute queries on any object in the circuit. For example, a user can select any object on a circuit, the network analysis module 240 can access the network model data 280 to recall information such as the power source for that object and the phases that reach the object from the power source and instantly display the results on the map, without performing additional calculations or network operations (e.g., communicating with a server over a communication network).

In some embodiments, the structure of the output from the mapping module 230, i.e., a directed graph streamlined for electric circuit tracing in both upstream and downstream directions and other network analyses, can be fully represented in an object oriented programming language using two classes: one class to represent the directed edges with their attributes, and the network class itself that includes the network objects, the adjacencies between the objects (i.e., the directed edges), and the mapping of network object IDs to array index values.

In some embodiments, the adjacency list representing the undirected graph (generated by the undirected graphing module 220 or received from the GIS database 130) can support at least some of the operations relating to visualization, network analysis (e.g., tracing, load flow analysis, operating voltage calculations), validation and/or editing on a distribution network. As such, the adjacency list representing the undirected graph can be stored locally on the client device (e.g., in a cache memory 280) in its original form, or in a form (e.g., array, hashtable) optimized for lookup speed (e.g., via the mapping module 230).

In some embodiments, the network configuration change detector 260 can detect changes to the configuration of a network. Network configuration changes that the network change detector 260 can detect can include, but are not limited to: changes in network topology (e.g., adding, deleting, moving, and/or swapping components or features) and changes in component configuration (e.g., changing diameter of a pipe, changing kVA rating of a transformer). The network change detector 260 can notify the network analysis module 240 and/or the rendering engine 250 when any network configuration changes are detected.

In some embodiments, the network analysis module 240, via its components, can perform various network analyses on distribution networks. In some embodiments, the validation engine 250 listens for network configuration changes as a user builds out a network (e.g., via network configuration change detector 260) to inspect the network for invalid network configurations that do not meet requirements and/or standards specified by validation rules 285 that are stored locally. The validation rules can target specific issues such as insufficient signal strength and powering overcurrent and undervoltage, depending on the type of distribution network. The validation rules can be configured and extended to target the specific requirements of a user and/or organization.

By way of example, consider a Radio Frequency (RF) network design. One way to validate the RF network design is to traverse the network from its signal source to all downstream components. The network traversal requires many iterations over the adjacency list. Starting with the signal source vertex, one approach to performing this traversal is to read the adjacent (downstream) components, push the non-visited, adjacent vertex identifiers onto a stack, pop the next vertex identifier off this stack, perform the necessary operations with the current vertex, push the adjacent vertices onto the stack, and continue this loop until no items remain on the stack to visit.

Some network configuration changes have far reaching impacts on various aspects of the network. For example, in the case of a RF network design, network configuration changes can impact RF signals and component powering. While some network evaluation optimizations may be possible, most network changes to topology or component configuration can involve the validation engine 250 evaluating all components on a leg off a node or even the entirety of the network connected to a common node against RF network validation rules. In some embodiments, the validation engine 250, via the power calculation engine 255, can reevaluate all powering rules on the common power network fed by a power supply in the event any change impacting network topology or internal powering configuration is detected (e.g., by the network configuration change detector 260).

Before validation of component powering can be performed, the power calculation engine 255 can calculate the voltage and current through each component of the RF network. In some instances, to resolve these values the portion of the network powered by a power supply can be determined. While power delivered to the active components of an RF network is delivered along the same cables providing the RF signals to and from the optical node, the power network does not typically have the same topology as the RF network. The powering network for a component may span multiple node boundaries through the use of power inserters and coax cable that bridge networks to reduce the number of power supplies necessary to drive a Hybrid fiber-coax (HFC) network. Likewise, a single RF network may have sections powered by power supplies bridged from other node boundaries. The power calculation engine 255 can calculate the current and voltages through components by determining the logical, hierarchical powering network fed by a power source. The determination can include locating a power supply and using the RF network graph (e.g., directed graph) to determine the components connected to this power supply. Further traversal downstream from a component can mean deeper inspection of a component's internal configuration by the power calculation engine 255 to determine which ports can supply power and which have had an internal fuse pulled thereby blocking power through a port. Once the power network has been determined, the power supply specs can be referenced to find the operating voltage of the power supply. The entire power network can be set at this operating voltage and then an iterative algorithm can be used to evaluate the current draw and resultant voltage in and out of each component until the total current draw residual at the power supply is within a predefined margin. For cables, the voltage drop can be determined by the cable length, resistance per length, and current draw through the cable. Active components use switching power supplies to pull a relatively constant power—as input voltage drops the current draw will increase. This current to voltage profile can be defined within the catalog specification for a given active component. These properties for cables and active components can be used in each step of the iterative algorithm. After voltages and current draws are calculated they are held by the power calculation engine 255 in an immutable data structure (e.g., as power calculations data 290 in a local storage) and may be looked up by the validation engine 250 to evaluate against the power validation rules to ensure the voltage input into active components is at or above minimum requirements and total current passing through any component is below the component's operating amperage rating. In some embodiments, the power calculation data can also be accessed by the rendering engine 250 for feedback in the user interface (UI) of the disclosed system.

In the case of an electric distribution circuit, when load is added downstream of a component, that load can augment the load on all the conductors upstream of the component all the way back to the circuit source. In some embodiments, the power calculation engine 255 can perform a load flow analysis to determine the amount of current flowing through the conductors. Based on the calculated current and applicable validation rules, the validation engine 250 can determine if any of the conductors are too small in size. The validation engine 250 can then provide feedback indicating that the conductors are carrying too much load. Similarly, adding load anywhere on the feeder can bring voltages down almost everywhere on the feeder. The validation engine 250 and the power calculation engine 255 can together determine if the additional load causes the voltage at the component to drop below a minimum threshold, typically set by the utilities.

The validation engine 250 can store the results from the validation for notification and/or other purposes. In some embodiments, the validation engine 250 can capture each violation in a validation result object to provide a user-friendly message about the issue, severity, and information about the components in violation. The collection of validation result objects can be used to provide a list of issues to be addressed in the design. In some embodiments, the violations can be presented in the geographic and schematic views of the network (e.g., rendered by the rendering engine 250). The validation results 295 can be stored locally in some embodiments.

In some embodiments, the disclosed system allows real-time analysis and calculations to be performed on a network design even as the network design is being modified. This functionality is enabled by the distribution network modeling engine 215 that creates new data structures to represent the states of the network as modifications are made to a network design. For example, consider a network design that is being edited by a user. The current state of the network design is represented by a data structure, but the state of the network design after the modification is represented by a new data structure. With this approach, one thread can traverse the network to perform a network analysis, while another thread can perform a component swap on that same network to create a new data structure without changing the state of the network that the first thread is referencing. The multi-threaded approach utilized by the disclosed system improves the application performance, making it real-time or near real-time.

In some embodiments, the new data structure is generated by transforming the old data structure in such a way that the new data structure comprises of vertices that changed and reference points to vertices that did not change. By creating the new data structures to include reference points to the old data structure, the disclosed system can reduce the memory cost of storing and tracking the various states of a network design. Moreover, by taking into account the information that typically changes as a group, one group can be separated from another to reduce the number of new data structures that need to be instantiated during the lifetime of the network design. The memory savings described herein can be achieved using Microsoft .NET's Immutable Collections library in some embodiments. The network analysis module and validation of network designs is described in detail in concurrently filed, co-pending U.S. application Ser. No. 15/398,654, entitled "System and Method for Validating Network Configuration Changes in a Client Environment," the entire content of which is incorporated herein by reference in its entirety.

In some embodiments, the command builder 270 can receive information about one or more operations performed on a network design to change its configuration from the network configuration change detector 260. The command builder 270 can then build a command from the one or more operations to modify the network, encapsulating necessary information to perform the one or more operations, so that the command can be executed at a later point in time or against a different version of the network with the same effect. The command builder 270 can record the commands corresponding to operations performed on the network to modify the network or change the configuration of components in the network (i.e., network operations) serially in a data file in some embodiments. For example, the commands can be serialized in an XML, JSON or another suitable file or format. The command data 296 can be stored locally on the client device.

In some embodiments, the set of data structures representing the various states of a network as modifications are made to the design of the network, and the sequence in which those data structures are created can be tracked and utilized by the network modeling engine 215 to build a stack of snapshots of the network. Each snapshot of the network can thus provide information about the configuration of the network at a particular point in time. Using this stack, the undo/redo module 276 can execute "undo" and "redo" commands to switch between network states.

The hypernode builder 265 represents a branch of a network truncated by an extraction area as a single node to store network information more efficiently. In the electrical domain, such a branch may include network assets that are not going to be modified or referenced as part of editing work in the extracted area, but may include feeder information that may be needed for deriving feeder properties such as phase load for network analysis. Thus the hypernode can store relevant upstream information efficiently, which can improve application performance and also facilitate faster sharing of network information with other client devices and/or systems.

In some embodiments, the network sync and merge engine 275 can synchronize ("sync") updates made to a network design outside of the GIS 130 (e.g., in the design environment of the design application 120 executing on a client device 105) to the GIS 130. The network sync and merge engine 275 can access a first state of the network as it was loaded from the GIS 130 from a local storage on the client device. The first state of the network thus corresponds to the state of the network in the GIS 130. The network sync and merge engine 275 can also access a second state of the network from the local storage on the client device. The second state of the network can be the state of the network resulting from operations performed on the network. The network sync and merge engine 275 can then compare the second state of the network to the first state of the network to determine updates to the networks. In some embodiments, the network sync and merge engine 275 can transform the updates into a data structure that is easily ingestible by the GIS 130 (e.g., by applying a pre-defined schema). The network sync and merge engine 275 can then send the updates to the network to the GIS 130 to update the current state of the network in the GIS to a new state so that the new state is synced to the state of the network in the client device.

In some embodiments, the network sync and merge engine 275 can also merge two or more network designs into a single design. For example, the network sync and merge engine 275 can reconcile changes made to the same area or different areas of the network at different locations (e.g., different devices), or at different points in time based on commands. The command builder 270 can transform operations performed to modify topology of a network into a set of commands. The network sync and merge engine 275 can then execute the set of commands or a subset thereof against another network to merge the two networks. The network sync and merge engine 275 can also compare network designs and automatically resolve conflicts that may arise from the merging in some instances.

Figure 2B:
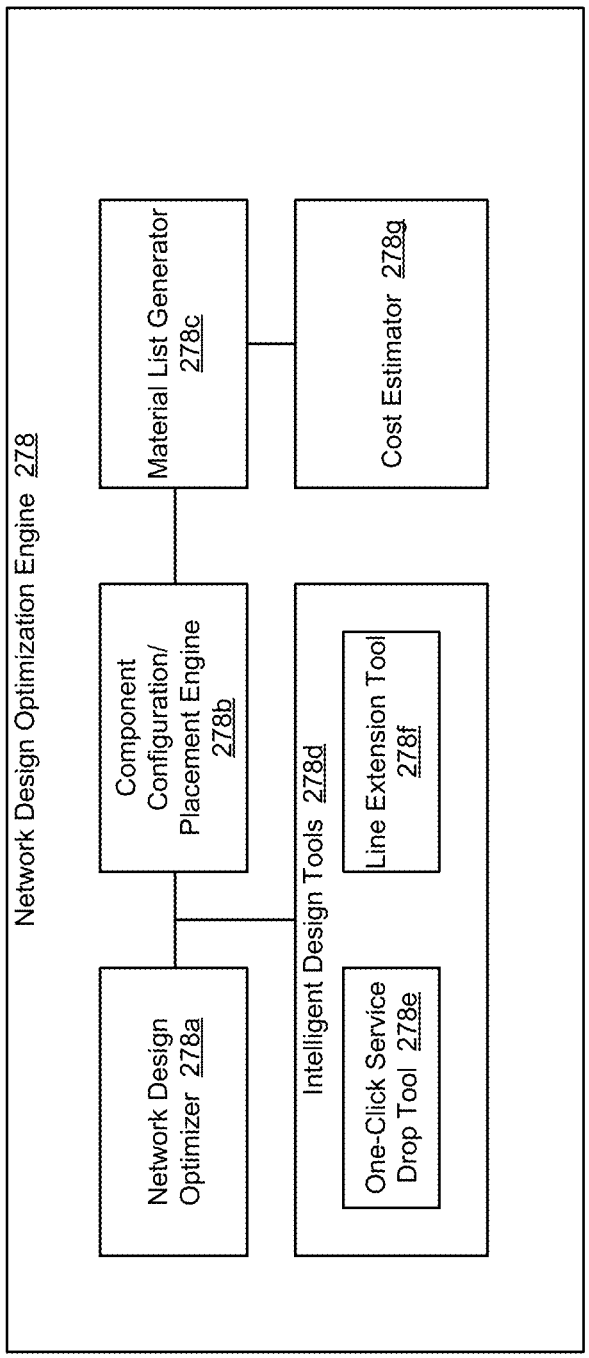
FIG. 2B is a block diagram illustrating the distribution network optimization engine of the disclosed system in detail.

In some embodiments, the network design optimization engine 278 (or optimization engine 278) can optimize network designs and streamline the process of designing networks. Referring to FIG. 2B, the optimization engine 278 can include a network design optimizer 278a, a component configuration/placement engine 278b, a material list generator 278c, intelligent design tools 278d including a one-click service drop tool 278e and/or a line extension tool 278f and/or a cost estimator 278g.

The network optimizer 278a in some embodiments can perform network design optimization by executing optimization algorithms on multiple immutable network snapshots (or network states). Many, if not most, algorithms that are well suited to optimizing a network design work by iteratively generating and evaluating network configurations. Many of these algorithms can benefit from parallel generation and evaluation to reduce computation time and some classes of optimization algorithms need to maintain multiple network configurations in memory for computations. As the disclosed system provides assurance of immutability of network states, the implementation of these optimizations algorithms is significantly simplified. The disclosed system can maintain an ancestral hierarchy of network states where the network design optimizer 278a can evolve and rank multiple branches simultaneously and determine if a particular branch is going to provide a worthwhile design or abandon it completely in favor of a more fruitful design branch. As with a single design lineage, the network design optimizer 278a uses the immutable approach to enable users to work with an entire design hierarchy without the need for thread access synchronization and since common ancestry may be shared through reference pointers, it becomes possible to work with a relatively large tree before hitting memory constraints. As such, the network design optimizer 278a helps overcome performance constraints and complexity associated with performing network optimizations.

In some embodiments, the component configuration/placement engine 278b can facilitate streamlining of the network design process and optimization of network designs by generating multiple component configurations and/or placement options. The component configuration/placement engine 278b can listen for network changes (e.g., detected by network configuration change detector 260) to detect placement of a component in a distribution network design. When such a message is received/detected, the component configuration/placement engine 278b can generate potential component configuration and/or placement options. In some aspects, the component configuration options can be generated based on information about the properties of the component. Such information may be accessed from the catalog(s) 135B, a project file (e.g., project file data 297) associated with a network design, a configuration file, or the like. In some instances, the placement options can be determined based on the initial location where the component was placed, and constraints (e.g., user defined or predefined) which allow the component configuration/placement engine 278b to move the component +/−N positions in one or more directions of freedom. The component configuration/placement engine 278b can derive a number of design alternatives (or new network designs) from an original or initial network design by incorporating the component configured in the generated configuration options placed at the generated location options. The network design optimizer 278a can evaluate, in parallel, the original network design and the design alternatives against one or more design policies to identify a preferred network design that is the best fit from among the original design and all the design alternatives.

In some embodiments, design goals can include optimizing performance, reliability of the network design, financial cost, and/or the like, or a combination thereof. In some embodiments, the network design optimizer 278a can evaluate the original design and the design alternatives against a design goal by computing a design goal metric (e.g., an optimization score) for each network design. An optimization score can be indicative of a degree or level of optimization with respect to one or more design goals. A preferred network design can be the network design that has an optimization score that is highest among the calculated optimization scores, indicating that the preferred network design has a higher degree of optimization with respect to the design goal compared to other network design alternatives. In some embodiments, computing an optimization score for a network design can include performing one or more network analysis computations against a network model underlying the network design. In some embodiments, the network analysis computations can be performed by the network analysis module 240.

By way of example, consider a network design where a user has placed a 60-Amp type N fuse at a location that has a backup of 80-Amp type N fuse. In response to the placement of the fuse, the network design optimizer 278a can trigger a fuse coordination evaluation as part of the optimization process. A fuse coordination evaluation is applied to a pair of fuses, where one fuse lies directly upstream of the other fuse (with respect to the direction of power flow in the circuit), with no other fuse or protective device lying in between the pair. The downstream fuse in this pair is referred to as "the protected fuse," while the upstream fuse is referred to as "the backup fuse." The goal is to ensure that any faults that occur downstream of the protected fuse will cause the protected fuse to open (i.e., its element to melt due to the fault current) before the backup fuse approaches its melting point (due to that same amount of fault current). To perform the fuse coordination evaluation, the network design optimizer 278a identifies one or more fuse options for the protected fuse, which includes the fuse option selected by the user as well as one or more alternatives (e.g., fuses with different current ratings such as 40-Amp type N fuse, 50-Amp type N fuse, etc.) that could potentially replace the user selected fuse option. The network design optimizer 278a then evaluates, in parallel, each network design including a fuse pair comprising a fuse option and the backup fuse. The evaluation, in some embodiments, can include performing various analyses on each network design. For example, the network design optimizer 278a (e.g., via the network analysis module 240) can calculate a maximum fault current in each case and utilize a Time-Current Characteristic curve (TCC curve) for each fuse in the pair to determine a time $T_1$ at which the protected fuse starts to melt and a time $T_2$ which is the point of no return for the backup fuse. The network design optimizer 278a can then select a network design with a fuse pair where the protected fuse is guaranteed to melt before the backup fuse approaches its melting point (e.g., a point of time where the backup fuse is close enough to melting that some irreversible damage has been done to the fuse) when the same maximum fault current is flowing through the fuses. Following this fuse coordination evaluation of each fuse pair option, the network design optimizer 278a, in some embodiments, can score and rank each pair according to how well coordinated it is (e.g., based on the difference between $T_1$ and $T_2$) in order to select a fuse pair that is best coordinated. In this example, instead of the 60-Amp type N fuse selected by the user, the network design optimizer 278a may select a 40-Amp type N fuse as the optimal choice because of the level of coordination that the fuse option choice achieves with the 80-amp type N backup fuse.

In some embodiments, the network design optimizer 278a can utilize the preferred design alternative to update the original network design. Updating the original network design to the preferred design alternative can include changing the configuration of the component and/or placement location of the component in some embodiments. In some embodiments, the updating can be in response to receiving of a user confirmation by the network design optimizer 278a.

In some embodiments, the network design optimizer 278a can request the material list generator 278c to generate a material list for one or more design alternatives that it is evaluating or has evaluated. The material list generator 278c, in turn, can generate a material list or bill of materials for each network design. In some embodiments, the cost estimator 278g can compute one or more different types of cost associated with a network design, such as labor cost, material cost, total cost, and the like.

The intelligent design tools 278d can include tools such as the on-click service drop tool 278e, the line extension tool 278f, or the like that follow a workflow that can include automatically selecting appropriate materials and equipment, component configuration, component placement, and the like based on information about the properties of components, existing network configuration as well as rules and standards particular to a utility (e.g., design policies).

For example, suppose a user drags and drops a new tap or amplifier in a hybrid fiber/coaxial (HFC) network. The component configuration/placement engine 278b can listen for a message indicating the placement of the new tap or amplifier in the coax network. As a signal traverses through the RF network its signal is attenuated. A tap, which is rated for the attenuation of signal at its output, placed near a node or an amplifier will be fed a greater strength input signal than a tap further down the cable would observe. To achieve a relatively equivalent strength signal at the output of each subscriber's drop line, the taps along a cable need to have different tap values (e.g., −12 dB, −15 dB attenuation of signal at tap ports). Taps closer to an amplifier need a higher tap value than those further away. Tap manufacturers typically offer two-way, four-way, and eight-way taps with each of these lines available with a half-dozen or more different tap values. The selection of a tap value is determined by the incoming signal strength in the forward and return directions, the target values at the taps for the forward signal, and at the upstream amplifier input for the return signal. The highest tap value that brings these target strengths in alignment without over attenuating the signal in either direction is typically used. At a minimum, the high-frequency and low-frequency strengths of the forward signal can be evaluated since the attenuation of signal through a coaxial cable is not linear across the frequency spectrum. Some taps also allow for reverse attenuators and forward equalizers to further aid in equalizing signal strengths among taps. Because of all these calculations, determining a tap value can take a significant amount of a designer's time. The engine 278b, however, can perform the necessary calculations in a fraction of a second. The engine 278b enables a designer to place a tap by only specifying a location and tap count (this tap count is typically gathered automatically from the strand network, i.e., undirected graph) and the engine 278b selects and inserts the optimal tap from the collection of taps available for use. Similarly, the engine 278b can also select pads and equalizers for each amplifier from dozens of different pads and equalizers offered by manufacturers. All of these component configurations can be performed in real-time without impeding the designer.

In some embodiments, the optimization engine 278 combines information from the NMC, the catalog 135B (from FIG. 1), and optionally, a third-party work management system's compatible units (CUs) to drive network and material optimization routines in real-time, as the user interacts with the NMC by modifying or extending elements in the network. Examples of such optimizations include:

1. Sizing electrical devices (transformers, fuses, and other protective devices) to handle the load in the network and coordinate properly with other devices upstream and downstream. This information can be supplied by the NMC in combination with properties derived from component specifications (for electric networks, the component specifications can be mapped to the equipment catalog 135B).

2. Structural optimization of overhead support structures such as poles size, material, and class, pole-top assembly optimization, and pole location for optimal sag/tension, pole loading (finite elements analysis), regulatory standards, and loading scenarios.

3. Surface structure optimization for underground infrastructure such as cabinet, pedestal, and vault placement, pulling angles, and trenching routes.

4. Sizing and selecting other components in the network (applicable to Electric, Gas, Water, or Telecom networks).

Where possible, calculations can be pre-calculated for static analysis elements or for parts of dynamic analysis and stored in a local storage (e.g., precalculated data 298) for rapid access and return of analytical information in some embodiments.

In some embodiments, the network model data 280, power calculations data 290, validation results 295, command data 296, project file data 297, precalculated data 298, design criterion rules 299, design policies 286 and/or other application data stored locally on the client device can be periodically uploaded to the host server 125 and/or another cloud repository for back up or other purposes. In some embodiments, all operations performed on a network design can be performed within the context of a workspace. As such, in some embodiments, the disclosed system can instantiate multiple workspaces to allow multiple network designs to be open (e.g., for viewing, editing, etc.) at the same time.

5. Example Methods

Figure 3:
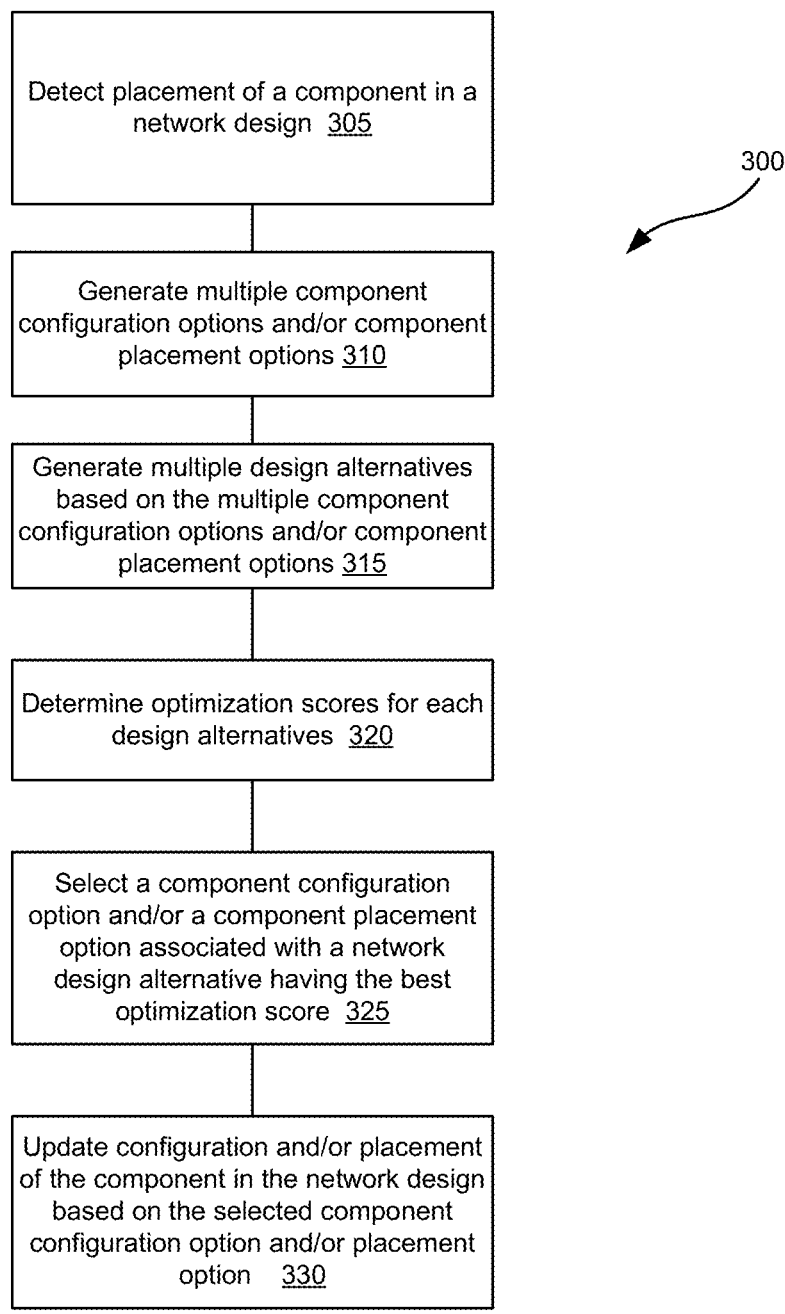
FIG. 3 is a logic flow diagram illustrating an example method of optimizing a distribution network design in accordance with some embodiments of the disclosed system.

FIG. 3 is a logic flow diagram illustrating an example method of optimizing a distribution network design in accordance with some embodiments of the disclosed system.

At block 305, the disclosed system (e.g., via network design optimization engine 278, component configuration/ placement engine 278b in FIG. 2B) can detect placement of a component in a network design (e.g., via a drag and drop action). The disclosed system (e.g., via network design optimization engine 278, component configuration/placement engine 278b in FIG. 2B), at block 310, can generate multiple component configuration options and/or component placement options. In some aspects, what the component configuration options and/or component placement options are depend on the component, but in general these configuration and/or placement options can have a direct or indirect impact on the network performance, cost or other optimization goal. In the case of a transformer for example, both the size and the location can be varied as they have an impact on the network performance and cost. Similarly, in the case of a conductor, diameter and material can be varied. At block 315, the disclosed system (e.g., via network design optimization engine 278, component configuration/placement engine 278b in FIG. 2B) can generate multiple design alternatives from the original network design based on the multiple component configuration options and/or component placement options. For example, a component having three different properties and that can be placed at seven possible locations may have $7^3$ or 343 possible alternative designs (i.e., 1 original design and 343-1 or 342 alternative designs derived from the original design) that the system can evaluate to determine a preferred or optimal design alternative.

At block 320, the disclosed system (e.g., via network design optimization engine 278, network design optimizer 278a in FIG. 2B) can generate optimization scores for each of the design alternatives generated at block 315. An optimization score calculation may include performing one or more network analyses on each of the design alternatives, and evaluation of the results of the network analyses against one or more design policies. As such, selection of an optimal design alternative can be based on information including property of the component, relationship that the component has with other components in the network design (i.e., the network model) and one or more design policies.

By way of example, suppose the component that was placed in the network design at block 305 is a conductor. Conductors with various properties (e.g., diameter, material) are available. The original network design and a number of design alternatives derived from the original network design by incorporating the conductors with various properties can be evaluated by calculating an optimization score for each design. The optimization function for determining the optimization score may seek to optimize a number of design goals or objectives. In the conductor example, suppose the design goal is to optimize the performance.

To optimize the performance, the disclosed system (e.g., via network design optimization engine 278, network design optimizer 278a, network analysis module 240 in FIG. 2B) can perform one or more network analyses on each design alternative. In the conductor example, the disclosed system can determine the worst case load on the conductor and the worst case voltage drop. The disclosed system (e.g., via network design optimization engine 278, network design optimizer 278a in FIG. 2B) can then determine the weight for the calculated load and voltage drop values. In some aspects, the weights can be determined off a weighting function as a function of a calculated value (i.e., calculated worst case load, calculated worst case voltage drop). In the conductor example, the weighting function as a function of voltage drop can be an exponentially decaying function where the weight is 1 or close to 1 when the worst case voltage drop is small (e.g., 0-2%). The weight is in between 1 and 0 when the worst case voltage drop is moderate (e.g., between 2-4%). And finally, the weight is 0 or very close to 0 when the worst case voltage drop approaches 5%. A similar weighting function can be used for determining the weight for the worst case load on the conductor. The two weights can then be added to determine the optimization score for the design alternative. For example, if 0.8 is the worst case voltage drop weight +0.6 is the worst case conductor load, then the score for the design alternative can be 1.4 (not normalized) or 0.7 (normalized). Moreover, if in the course of evaluating the network design, it is determined that a design alternative violates at least one of the applicable design policies, that design alternative is disqualified or ruled out (i.e., scores an optimization score of 0). Thus, in the above example, if the worst case voltage drop is 5.1%, which is a violation of an applicable design policy that requires any design have a voltage drop no more than 5%, the disclosed system returns an optimization score of 0, irrespective of how well the design alternative performs in other areas. In some embodiments, as validation rules are a subclass of the design policies, evaluating a design against one or more design policies includes evaluating against one or more validation rules. In other words, a network design that meets all applicable design policies also meets all applicable validation rules. However, the converse is not necessarily true, as a network design may satisfy all applicable validation rules, but yet fail to satisfy a design policy. An example of such a case may be a network design which has a design policy that requires the cost of the design stay under a threshold. In this scenario, selecting a 50 kV transformer to feed a single residential service point would pass all of the validation rules, but such a design would be prohibitively expensive and may fail to meet the design policy.

At block 325, the disclosed system (e.g., via network design optimization engine 278, network design optimizer 278a in FIG. 2B) can select a component option and/or component placement option (i.e., a design alternative) that has an optimization score higher than other design alternatives as a preferred design alternative. At block 330, the disclosed system (e.g., via network design optimization engine 278, network design optimizer 278a in FIG. 2B) can update the configuration and/or placement of the component in the network design based on the component configuration and/or placement option corresponding to the preferred design alternative selected at block 325. In some embodiments, the updating can be performed upon user confirmation.

In some embodiments, suppose the optimization goal is to optimize the cost of conductor while still meeting a threshold design standard for performance. In such a case, the disclosed system (e.g., via network design optimization engine 278, network design optimizer 278a, material list generator 278c, cost estimator 278g in FIG. 2B) can calculate a cost metric for each design alternative. In some aspects, the cost metric calculation can include calculating the actual or estimated cost of the components and labor associated with each design alternative. The disclosed system can then rank network design alternatives with optimization scores above a threshold (e.g., optimization score >=0.7) according to cost. A design alternative that costs the least, but has an optimization score of at least 0.7, indicating that the design alternative does not violate any of the applicable design policies. can be selected as the preferred design alternative. In other embodiments, other algorithms for minimizing cost and maximizing performance metrics can be used by the disclosed system.

Figure 4:
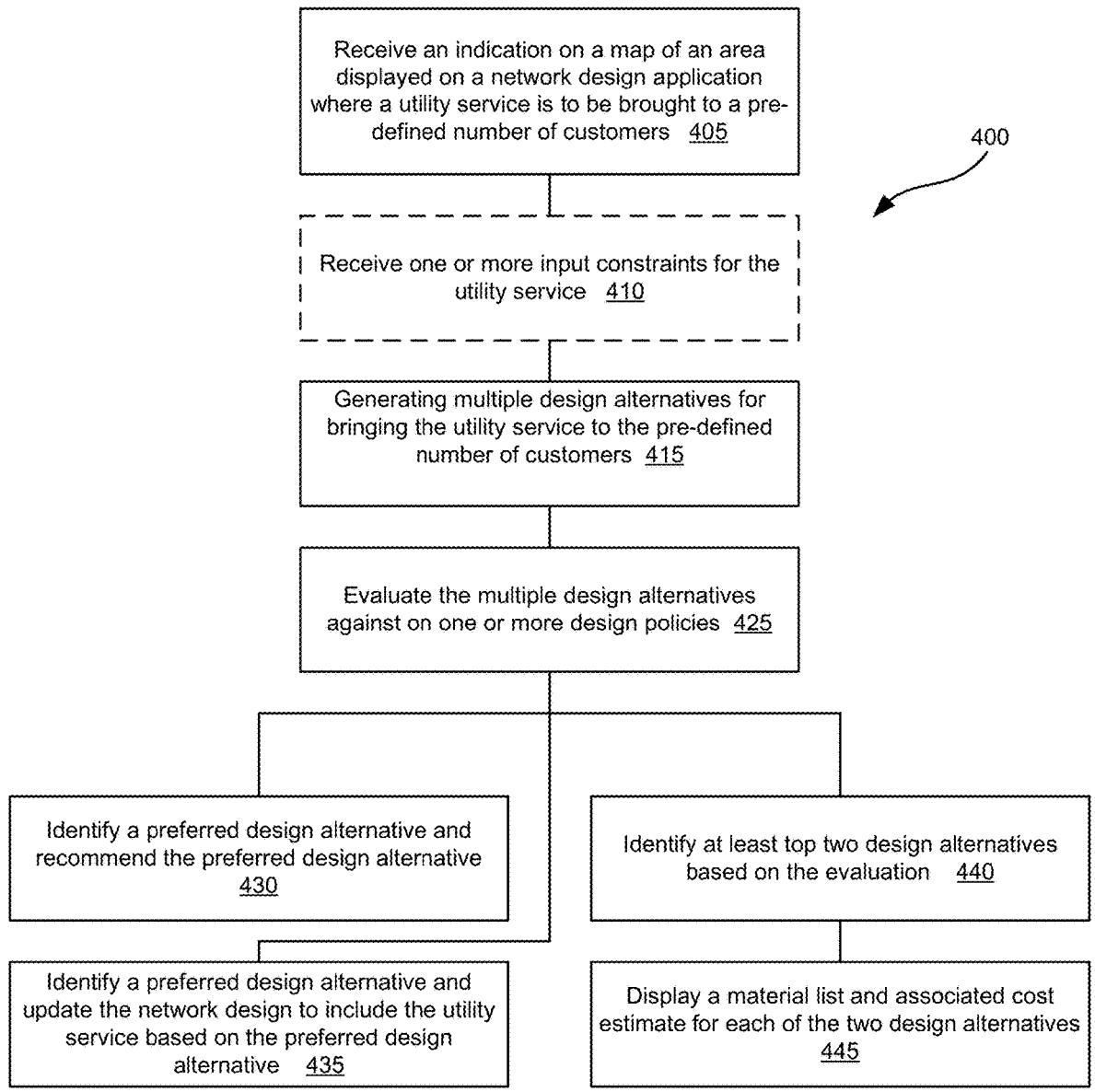
FIG. 4 is a logic flow diagram illustrating an example method of utility service drop tool to optimize a distribution network design in accordance with some embodiments of the disclosed system.

FIG. 4 is a logic flow diagram illustrating an example method of optimizing a distribution network design via a utility service drop tool (e.g., one-click service drop tool 278e in FIG. 2B) in accordance with some embodiments of the disclosed system.

In the example method 400, the disclosed system receives, at block 405, an indication on a map of an area displayed on a network design application where a utility service is to be brought to a service a predefined number of customers. Such an indication can be made by a user by a finger or stylus tap or a mouse click, for example. In some embodiments, the disclosed system can receive one or more input constraints for the utility service at block 410. For example, the user can specify a number of transformers, overhead or underground cables, etc. At block 415, the disclosed system can generate multiple design alternatives for bringing the utility service to the pre-defined number of customers. The multiple design alternatives can include components of different types, quantities, and/or configurations, at different locations, and with different routing options, for example.

At block 425, the disclosed system can evaluate the multiple design alternatives against one or more design policies to select a preferred design alternative for the utility service drop that optimizes one or more design or optimization goals. By way of example, the one or more optimization goals can comprise optimizing performance, optimizing cost, or the like. Optimizing performance can further comprise performing one or more network analyses on each design alternative and evaluating the result of the analyses against one or more design policies to calculate its optimization score. Optimizing cost can include generating a material list associated with the design alternative and gathering price data for the material and labor and generating a cost estimate.

At block 430, the disclosed system can identify a design alternative from the multiple design alternatives based on the evaluation as a preferred design alternative. In some aspects, the preferred design alternative can be the design alternative that has the best optimization score among the multiple design alternatives that were evaluated. The optimization score provides an indication of how well a design alternative meets the design goals.

In some embodiments, at block 435, the disclosed system can identify a preferred design alternative and update the network design to include the utility service based on the preferred design alternative. In yet other embodiments, the disclosed system can identify at least top two design alternatives based on the evaluation at block 440. The disclosed system can then display a material list and associated cost estimates for each of the two design alternatives at block 445. In instances, where cost optimization is a design goal, the cost metric computation can include the steps of creating a material list and generating associated cost estimates. The precomputed data can be used at block 445.

Figure 5A:
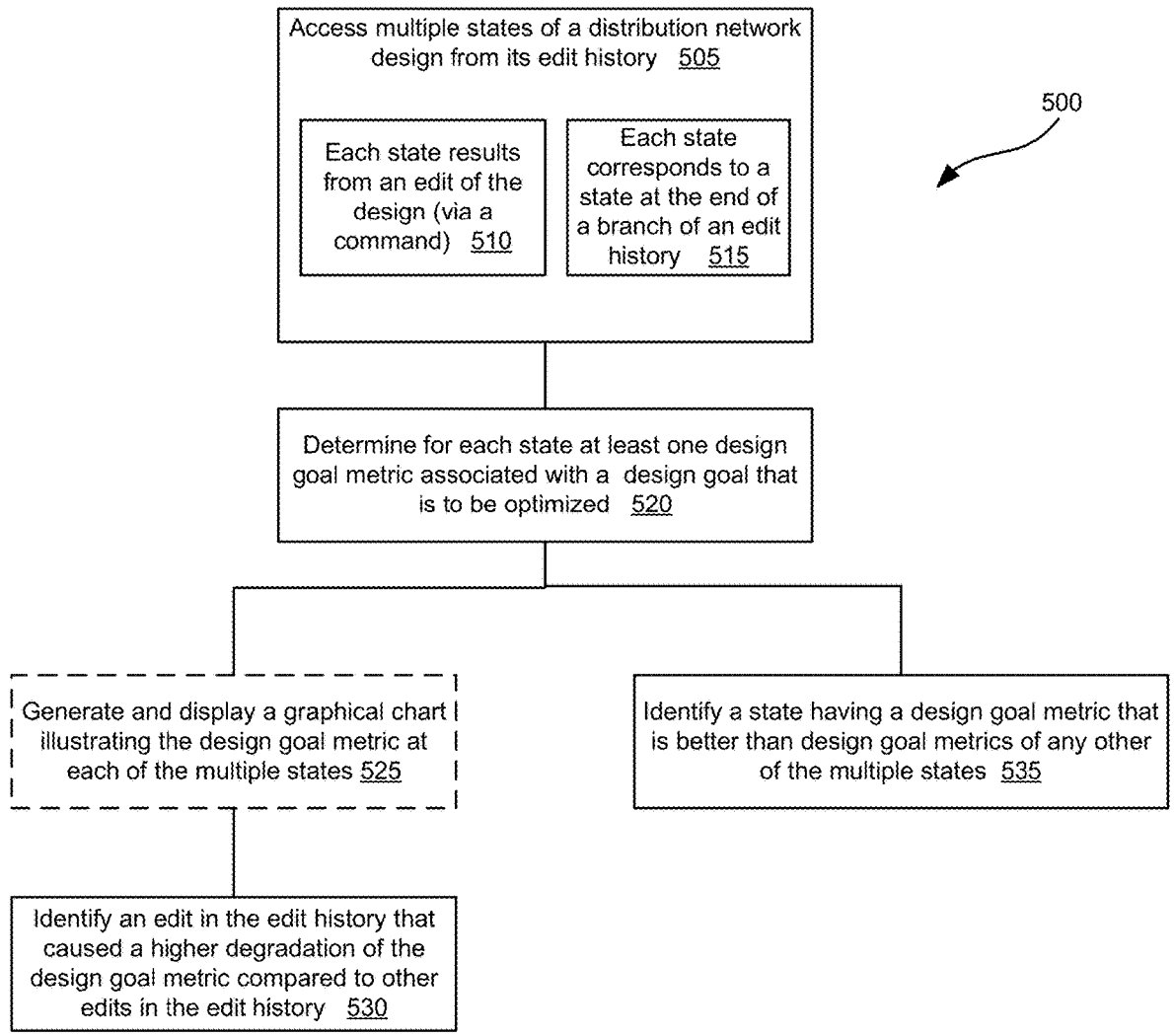
FIG. 5A is a logic flow diagram illustrating an example method of concurrently evaluating multiple states of a distribution network design to optimize a design goal metric in accordance with some embodiments of the disclosed system.

FIG. 5A is a logic flow diagram illustrating an example method of concurrently evaluating multiple states of a distribution network design to optimize a design goal metric in accordance with some embodiments of the disclosed system.

The example method 500 includes the disclosed system (e.g., the network design optimization engine 278 in FIG. 2B) accessing multiple states of a distribution network design from its edit history at block 505. The edit history records or tracks a history of edits made to a network design. The edit history can be captured as a series of operations performed on a network design, as a series of commands built from the series of operations, and/or a stack of network snapshots. An example of an edit history comprising a series of commands applied to a network design is illustrated in the graphical diagram of FIG. 5B. The graphical diagram of FIG. 5B also illustrates multiple design alternatives corresponding to multiple edit history branches in accordance with some embodiments of the disclosed system.

Figure 5B:
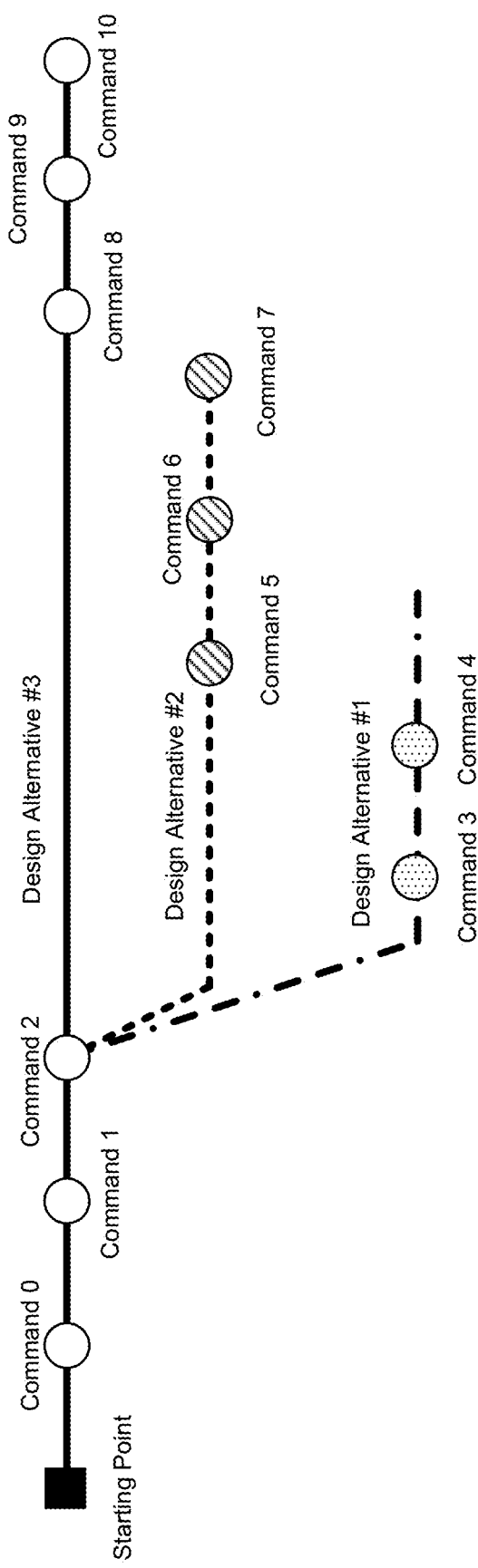
FIG. 5B is a graphical diagram illustrating multiple design alternatives corresponding to multiple edit history branches in accordance with some embodiments of the disclosed system.

In some embodiments, each state of a distribution network design may result from an edit of the design (e.g., via a command) at block 510. In FIG. 5B, these states correspond to the state after command 0 is applied, state after command 1 is applied, state after command 2 is applied, state after command 3 is applied, and so on. Alternatively, each state from the edit history can correspond to a state at the end of a branch of an edit history at block 515. In FIG. 5B, the edit history branches after command 2 into three design alternatives. These states correspond to the state at the end of design alternative #1 edit history branch (i.e., state after command 4 is applied), the state at the end of design alternative #2 edit history branch (i.e., state after command 7 is applied) and the state at the end of design alternative #3 edit history branch (i.e., state after command 10 is applied).

At block 520, the disclosed system determines for each state at least one design goal metric that is to be optimized. A design goal metric is a metric associated with one or more design goals to be optimized. Determining a goal metric can include computing an optimization score. In this instance, one or more network analyses can be performed at each state, and results of the network analyses can be evaluated using one or more design policies to compute the optimization score for the state.

Figure 5C:
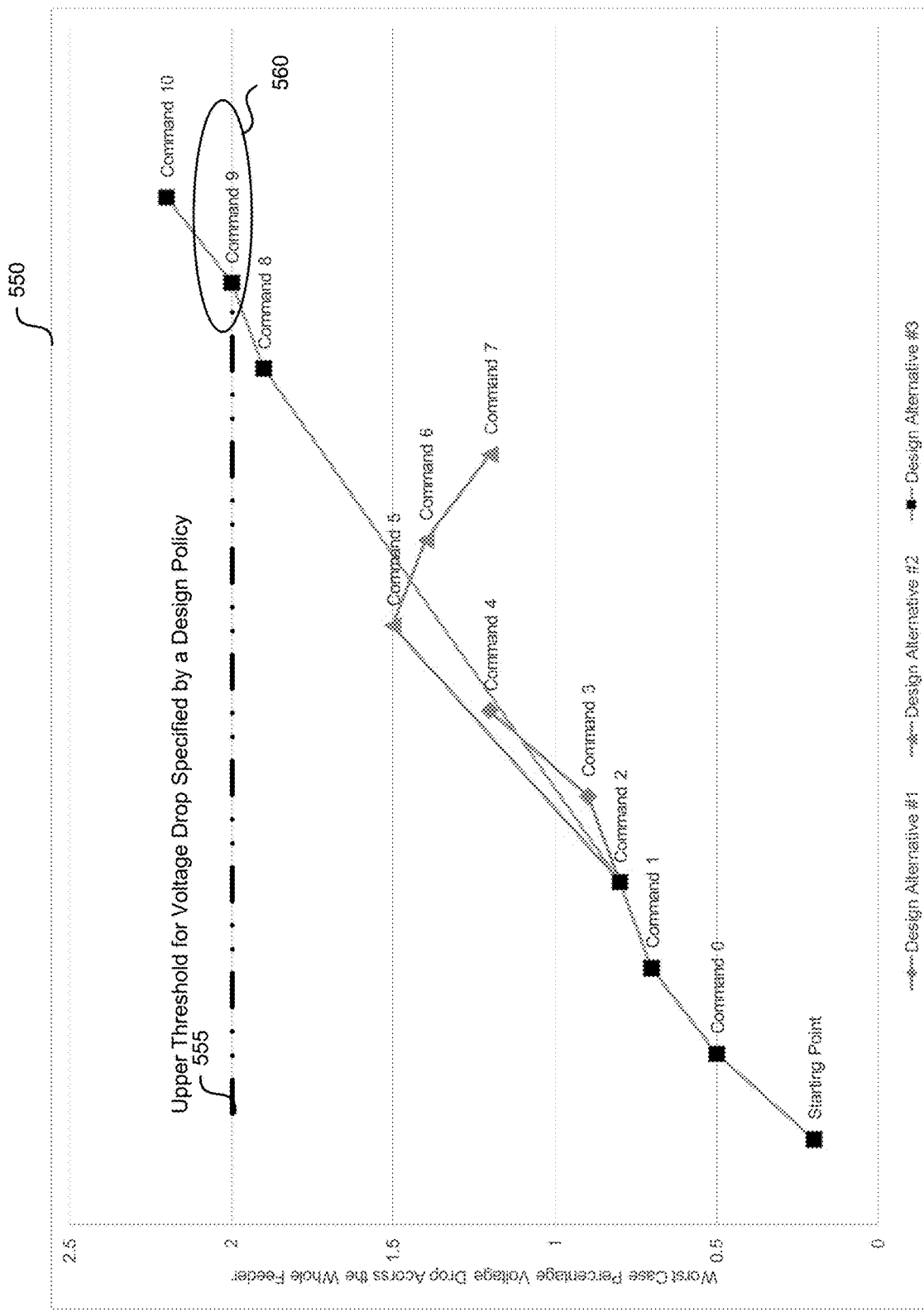
FIG. 5C is a graphical chart illustrating design goal metrics at different states corresponding to edits is the edit history branches of FIG. 5B in accordance with some embodiments of the disclosed system.

In some embodiments, the disclosed system can generate and display a graphical chart illustrating the goal metric (e.g., optimization score), cost metric and/or performance metrics (e.g., worst case load, worst case voltage drop) at each of the multiple states at block 525. An example of such a graphical chart is illustrated in FIG. 5C. FIG. 5C depicts the worst case percentage voltage drop across the whole feeder in the vertical axis, and timing in the horizontal axis. The corresponding worst case percentage voltage drop at each state corresponding to an applied command is depicted in the graphical chart 550 for all three branches of edit history depicted in FIG. 5B. The graphical chart 550 also includes a horizontal line corresponding to the upper threshold for the percentage voltage drop specified by a design policy. From the graphical chart, it can be clearly seen that command 9 caused the design alternative #3 to be ruled out as it failed to meet the design policy that requires that the worst case voltage be below 2%.

6. Computer Systemization

Figure 6:
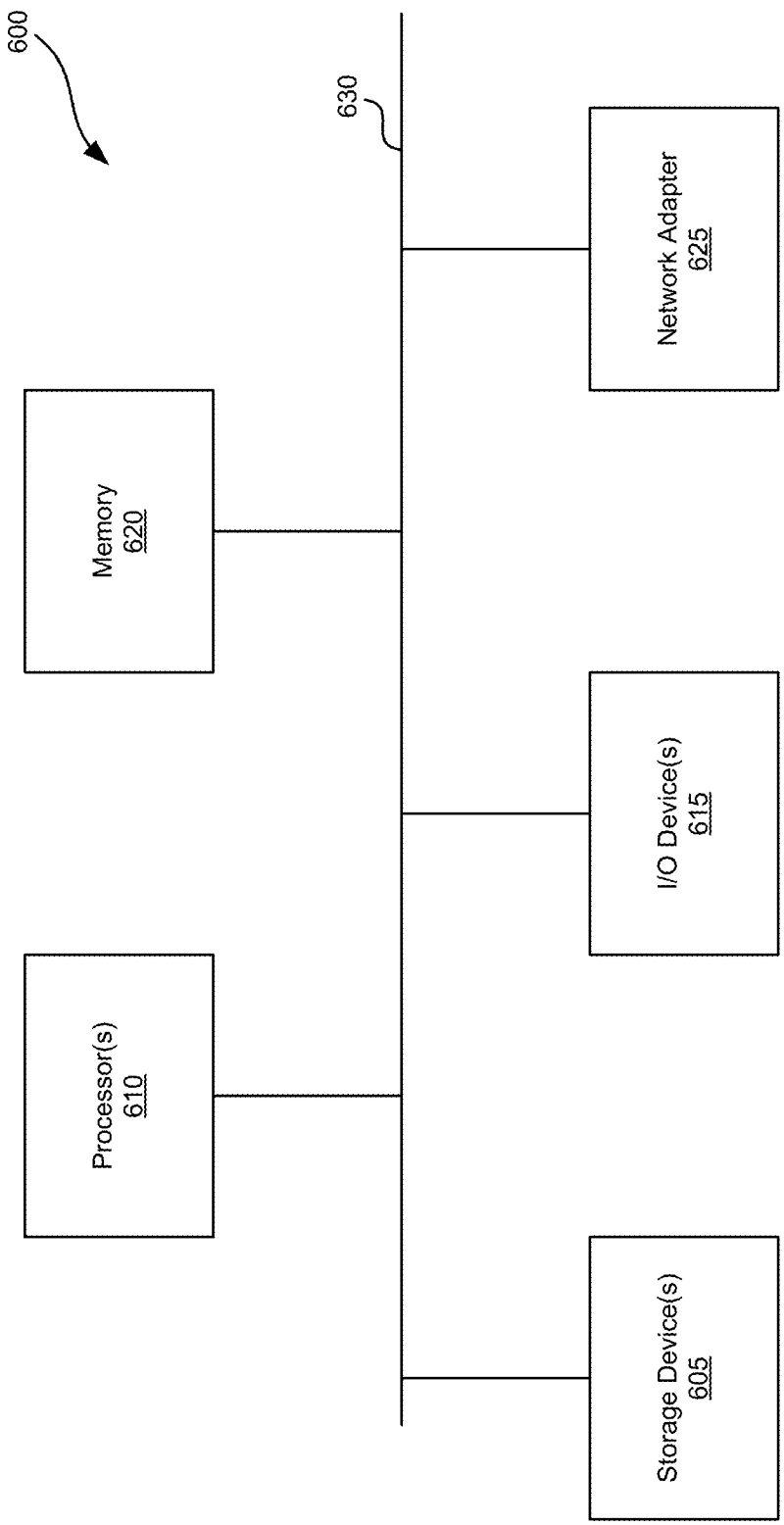
FIG. 6 is a block diagram of an exemplary apparatus that can perform various operations, and store various information generated and/or used by such operations in accordance with some embodiments of the disclosed system.

FIG. 6 is a block diagram of an exemplary apparatus that can perform various operations, and store various information generated and/or used by such operations in accordance with some embodiments of the disclosed technology.

The apparatus can represent any computer described herein. The computer 400 is intended to illustrate a hardware device on which any of the entities, components or methods depicted in the examples of FIGS. 1-5 (and any other components described in this specification) can be implemented, such as a server, client device 105, customer device 145, storage devices, databases (e.g., GIS database 130), network modeling engine 215, network analysis module 240, network configuration change detector 260, command builder 270, hypernode builder 265, network sync and merge engine 275, undo/redo module 276, optimization engine 278, rendering engine 250 and/or the like. The computer 600 includes one or more processors 610 and memory 620 coupled to an interconnect 630. The interconnect 630 is shown in FIG. 6 as an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 is/are the central processing unit (CPU) of the computer 600 and, thus, control the overall operation of the computer 600. In some embodiments, the processor(s) 610 accomplish this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computer 600. The memory 620 represents any form of random access memory (RAM), read-only memory (ROM), flash memory, or the like, or a combination of such devices. In use, the memory 620 may store a code. In some embodiments, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 610 through the interconnect 630 are a network adapter 625, a storage device(s) 605 and I/O device(s) 615. The network adapter 625 provides the computer 600 with the ability to communicate with remote devices, over a network and may be, for example, an Ethernet adapter or Fibre Channel adapter. The network adapter 625 may also provide the computer 600 with the ability to communicate with other computers within a cluster. In some embodiments, the computer 600 may use more than one network adapter to deal with the communications within and outside of the cluster separately.

The I/O device(s) 615 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 620 can be implemented as software and/or firmware to program the processor(s) 610 to carry out actions described above. In certain embodiments, such software or firmware may be initially provided to the computer 600 by downloading it from a remote system through the computer 600 (e.g., via network adapter 625).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the technology introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device (s) 605 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

7. Conclusion

The term "logic", as used herein, can include, for example, programmable circuitry programmed with specific software and/or firmware, special-purpose hardwired circuitry, or a combination thereof.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

The disclosed technology can also be adapted to other aspects of a utility distribution system such as the transmission/sub-transmission networks or the like.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the disclosed technology. Accordingly, the disclosed technology is not limited except as by the appended claims.

What is claimed is:

1. A method for optimizing a distribution network design in real time or near real-time, comprising:
   detecting, by a network design optimization system, placement of a component in the distribution network design, wherein detecting placement of the component in the distribution network design comprises detecting a user instruction to place the component in the distribution network design;
   deriving, by the network design optimization system from the distribution network design, at least one computer-derived design alternative to the distribution network design that includes a variation of the component in lieu of the component, wherein deriving the at least one computer-derived design alternative to the distribution network design is performed responsive to detecting the user instruction to place the component in the distribution network design;
   concurrently evaluating, by the network design optimization system using two or more concurrent computer processes evaluating respective distribution network designs, the distribution network design and the at least one computer-derived design alternative against one or more design policies to identify a preferred distribution network design that optimizes one or more design goals among the distribution network design and the at least one computer-derived design alternative; and
   presenting a graphical user interface comprising a visual history of (a) multiple states of the distribution network design and (b) design goal metrics associated with the multiple states.

2. The method of claim 1, wherein the variation of the component includes the component with a different configuration, the component at a different location, or both.

3. The method of claim 1, wherein the one or more design goals includes optimizing a performance of the distribution network design, a financial cost of the distribution network design, or both.

4. The method of claim 1, wherein concurrently evaluating the distribution network design and the at least one computer-derived design alternative against one or more design policies comprises one or more of:
   (a) computing at least two optimization scores associated with the distribution network design and the at least one computer-derived design alternative, the preferred distribution network design having an optimization score that is higher of the at least two optimization scores computed; or
   (b) performing one or more network analyses or computations against a network model underlying each network design and evaluating results against the one or more design policies.

5. The method of claim 1, wherein the one or more design policies are stored locally on a client device executing a design application for designing, editing and optimizing the distribution network design.

6. The method of claim 1, wherein the one or more design policies for an electric distribution network includes a requirement of one or more of:
   (a) that the worst case percentage voltage drop across the component be no more than a threshold; or
   (b) that the worst case load on the component be under a threshold or within a threshold range.

7. The method of claim 1, further comprising updating the distribution network design to correspond to the preferred distribution network design that best optimizes the one or more design goals between the distribution network design and the at least one computer-derived design alternative.

8. The method of claim 7, wherein the updating is in response to a user confirmation.

9. The method of claim 1, wherein the distribution network design is a network design corresponding to any one of: an electric distribution network, a gas distribution network, a water distribution network, or a telecom distribution network.

10. The method of claim 1, the visual history comprising a graphical chart that represents an edit history of the multiple states and the design goal metrics associated with the multiple states along the edit history.

11. The method of claim 10, the graphical chart further comprising a visual comparison of the design goal metrics with a threshold criterion for at least one of the one or more design goals.

12. A computer-implemented method for optimizing a distribution network design in real-time, comprising:
- detecting placement of a component in an original distribution network design, wherein detecting placement of the component in the original distribution network design comprises detecting a user instruction to place the component in the original distribution network design;
- deriving, by a network design optimization system from the original distribution network design, multiple computer-derived design alternatives, each computer-derived design alternative including at least one change to a configuration of the original distribution network design, wherein deriving the multiple computer-derived design alternatives is performed responsive to detecting the user instruction to place the component in the original distribution network design;
- determining in parallel, by the network design optimization system using two or more parallel computer processes evaluating respective distribution network designs, a goal metric associated with at least one design goal that is to be optimized for each of the original distribution network design and its computer-derived design alternatives;
- identifying, by the network design optimization system, one of the original distribution network design and its computer-derived design alternatives as a preferred distribution network design based on the goal metrics, wherein the goal metric of the preferred distribution network design indicatives a higher level of optimization with respect to the at least one design goal compared to other of the original distribution network design and its computer-derived design alternatives; and
- presenting a graphical user interface comprising a visual history of (a) the multiple states of the distribution network design and (b) design goal metrics associated with the multiple states.

13. The method of claim 12, wherein the distribution network design corresponds to any one of: an electric distribution network, a gas distribution network, a water distribution network, or a telecom distribution network.

14. The method of claim 12, wherein the at least one change to the configuration of the original distribution network design includes a change in configuration of the component, a change in a position of the component, or both.

15. The method of claim 12, further comprising:
- updating the original distribution network to match configuration of the preferred distribution network; and
- performing one or more operations the results of which are affected by the updating.

16. The method of claim 15, wherein the one or more operations include at least one of: updating charts and data characterizing forward and return signal profiles, updating graphic and schematic views of the distribution network, or performing network topology validations and powering calculations.

17. The method of claim 15, wherein the one or more operations to be performed are defined as part of a workflow that is triggered by the updating.

18. The method of claim 12, further comprising:
- identifying another of the original distribution network design and its computer-derived design alternatives as a second preferred distribution network design based on the goal metrics;
- generating a material list for construction of each of the two preferred distribution network designs, the material list enumerating the type and quantity of each component, component internals and materials for construction.

19. The method of claim 18, wherein the material list includes a cost estimate for the construction, the cost estimate being generated based on information received from a pricing and inventory system.

20. At least one non-transitory storage medium storing computer code, wherein said computer code, when retrieved from the at least one storage medium and executed by one or more processors, results in:
- detecting, by a network design optimization system, placement of a component in a first state of a distribution network design, wherein detecting placement of the component comprises detecting a user instruction to place the component in the first state of the distribution network design;
- deriving, by the network design optimization system, a computer-derived second state of the distribution network design that is different from the first state, wherein deriving the computer-derived second state is performed responsive to detecting the user instruction to place the component in the first state of the distribution network design;
- retrieving, by the network design optimization system from digital storage, one or more data structures representing multiple states of the distribution network design, the multiple states comprising the first state and the computer-derived second state;
- determining, by the network design optimization system for each state, a design goal metric associated with at least one design goal that is to be optimized;
- identifying, by the network design optimization system, as a preferred state, a state of the distribution network design associated with a design goal metric that is indicative of the preferred state having a higher degree of optimization with respect to the at least one design goal relative to other of the multiple states; and
- presenting a graphical user interface comprising a visual history of (a) the multiple states of the distribution network design and (b) design goal metrics associated with the multiple states.

21. The at least one non-transitory storage medium of claim 20, wherein determining the design goal metric for each state further comprises performing one or more network analysis calculations and evaluating result of the calculations against one or more design policies.

22. The at least one non-transitory storage medium of claim 20, wherein said computer code, when retrieved from the at least one storage medium and executed by one or more processors, further results in:
- selecting the preferred state to be a current state of the distribution network design,
- wherein the selecting causes updating of visualization of the distribution network design to the preferred state.

23. The at least one non-transitory storage medium of claim 20, wherein each of the multiple states is a result of application of a command to a preceding state.

24. The at least one non-transitory storage medium of claim 20, wherein the multiple states corresponds to multiple design alternatives.

25. The at least one non-transitory storage medium of claim 20, wherein the one or more data structures comprise at least a first data structure defining the first state and a second data structure defining the computer-derived second state as a set of one or more differences between the computer-derived second state and the first state.

* * * * *